UNITED STATES PATENT OFFICE.

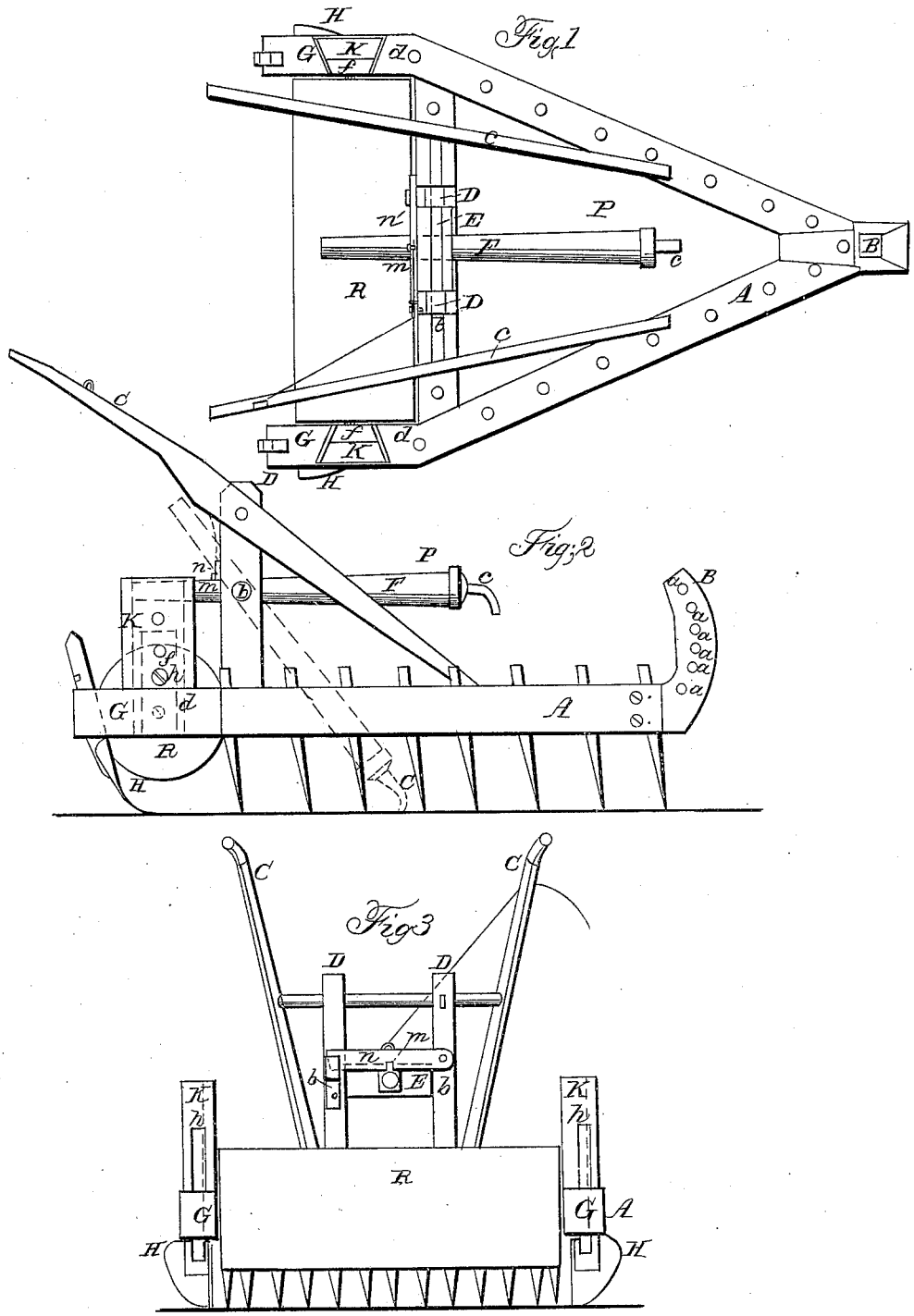

PHILIP H. KECK, OF MORGANTOWN, VIRGINIA.

IMPROVEMENT IN CULTIVATORS.

Specification forming part of Letters Patent No. 9,754, dated May 31, 1853.

*To all whom it may concern:*

Be it known that I, PHILIP H. KECK, of Morgantown, in the county of Monongalia and State of Virginia, have invented a new and useful Improvement in Cultivators; and I do hereby declare that the following is a full, clear, and exact description of the construction and operation of the same, reference being had to annexed drawings, forming part of this specification, in which the several parts are represented as follows:

Figure 1 is top view of the cultivator. Fig. 2 is a side elevation of the same. Fig. 3 is a rear elevation.

Similar letters in the several figures refer to the same parts of the machine.

The nature of my invention consists in constructing a cultivator which shall be a combination of the harrow, the roller, and the plow, so arranged as to assist each other when used together, and at the same time so constructed as to be used separately, should occasion require it; also, in attaching to the implement a balancing-pivot for the purpose of facilitating the turning of the cultivator when the extremity of the field is reached.

In the drawings, A represents the harrow, constructed in the usual manner, with the exception of the bow-piece B, which projects upward, and through which are the holes $a$, permitting the clevis to be raised or lowered, thus regulating the depth which the harrow-teeth sink in the soil.

C C are the handles, supported in the rear by the uprights D D, between which is the shaft E, working on the journals $b\ b$. Through this shaft E passes the lever F, armed at its anterior extremity with the bill-hook $c$, and movable about the journals $b\ b$. This system forms what I term the "balancing-pivot," the use of which I will presently describe.

To the rear of the harrow are the arms G G, carrying the two shovel-plows H H and the upright guide-pieces K K, in which are grooves $d\ d$, containing the slides $f\ f$, to which the roller R is fastened. By means of the grooves $d$ and slides $f$ the roller R can be raised or lowered at pleasure for the purpose of regulating the sinking of the harrow-teeth. The roller is maintained in position by the screws $h$, passing through the uprights K and the slides $f$.

The roller in a full-sized machine is about twelve inches in diameter, and is constructed of hard wood, so as to give it sufficient weight and solidity.

The machine is operated as follows: The ground having been well plowed in the ordinary manner, my improved cultivator, drawn either by one or two horses, according to the depth I wish the harrow-teeth to sink, is put upon the field. The lumps and clods are broken to some extent by the teeth of the harrow and then come under the roller, which reduces them completely and renders the soil mellow and compact, and thus better capable of nourishing the seed than when left loose. The shovel-plows following after make two furrows. In the one on the field side the dropper deposits the corn, which is covered by the outside furrow made by the return of the cultivator. When the cultivator arrives at the extremity of the field the lever F (which during the travel of the machine has been kept in the horizontal position seen in Fig. 2 by the pin $m$ in the top of the rear arm of the lever pressing against the face of the latch $n$) is allowed to fall by raising the latch $n$. This position is shown by the red lines in the figure. The sharp bill-hook $c$ then enters the ground, and by the forward motion of the cultivator the whole machine is raised from the ground and supported by the balancing-pivot, about which it is then revolved by the operator, the horse slightly backed until the machine is brought to the ground, the lever F raised into a horizontal position by a slight pressure upon its rear arm, the latch $n$ lowered, and the cultivator is ready to proceed, as before described.

By the use of the balancing-pivot P the smallest boy capable of driving is able to manage the largest-sized cultivator, and to any one it is a great saving of time and labor in turning the machine.

If small grain be sown, the plows H H are removed and the grain harrowed in and pressed down by the combination of the harrow and roller. The roller serves to mellow the ground and bring the soil into intimate contact with the seed, thereby preserving it and preventing the chance of its being left exposed by the loose soil blowing away from it.

By using this cultivator in planting corn the rows are all made the same distance apart, so that when the corn requires harrowing I have only to remove the roller and plows and I have a light harrow exactly fitting the rows of corn.

The movable slides $f$, to which the roller R is attached, are of great advantage, as by lowering the roller the harrow-teeth and shovel-plows will enter the soil but a small distance, thus affording a simple and effective means of regulating their sinking in the ground by altering the position of the roller. By removing both plows and teeth there remains a roller suitable for any purpose for which that implement is used.

If it be required simply to furrow out corn, I remove both roller and harrow-teeth, and the machine is an excellent one for the purpose. In fact, this cultivator combines the harrow, roller, and shovel-plow, which can each be used separately with as much facility as though separate implements, and when combined form an agricultural implement possessing great advantages over any other cultivator now in use.

What I claim as my invention, and desire to secure by Letters Patent, is—

The combination of the balancing-pivot P with a cultivator constructed as herein described, for facilitating the turning of the same, as herein specified.

In testimony whereof I have hereunto signed my name before two subscribing witnesses.

P. H. KECK.

Witnesses:
A. WELLS,
MOSES D. WELLS.